Jan. 15, 1929.　　　　　A. H. WADELL　　　　1,698,862
MACHINE FOR TRIMMING BEARINGS
Filed April 7, 1927　　　2 Sheets-Sheet 1
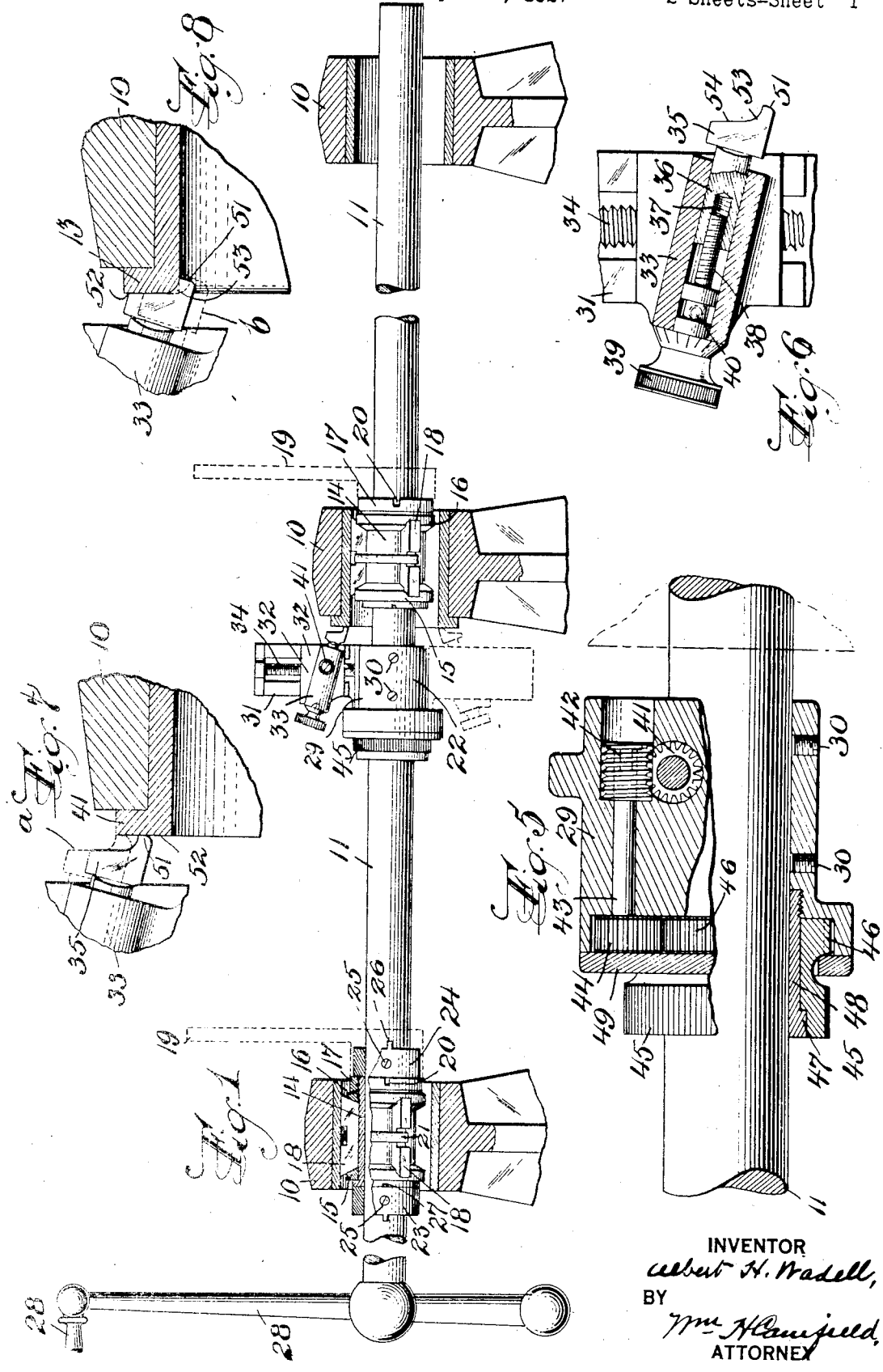

Jan. 15, 1929.　　　　　　　　　　　　　　　　　　　　　1,698,862
A. H. WADELL
MACHINE FOR TRIMMING BEARINGS
Filed April 7, 1927　　　　　2 Sheets-Sheet 2
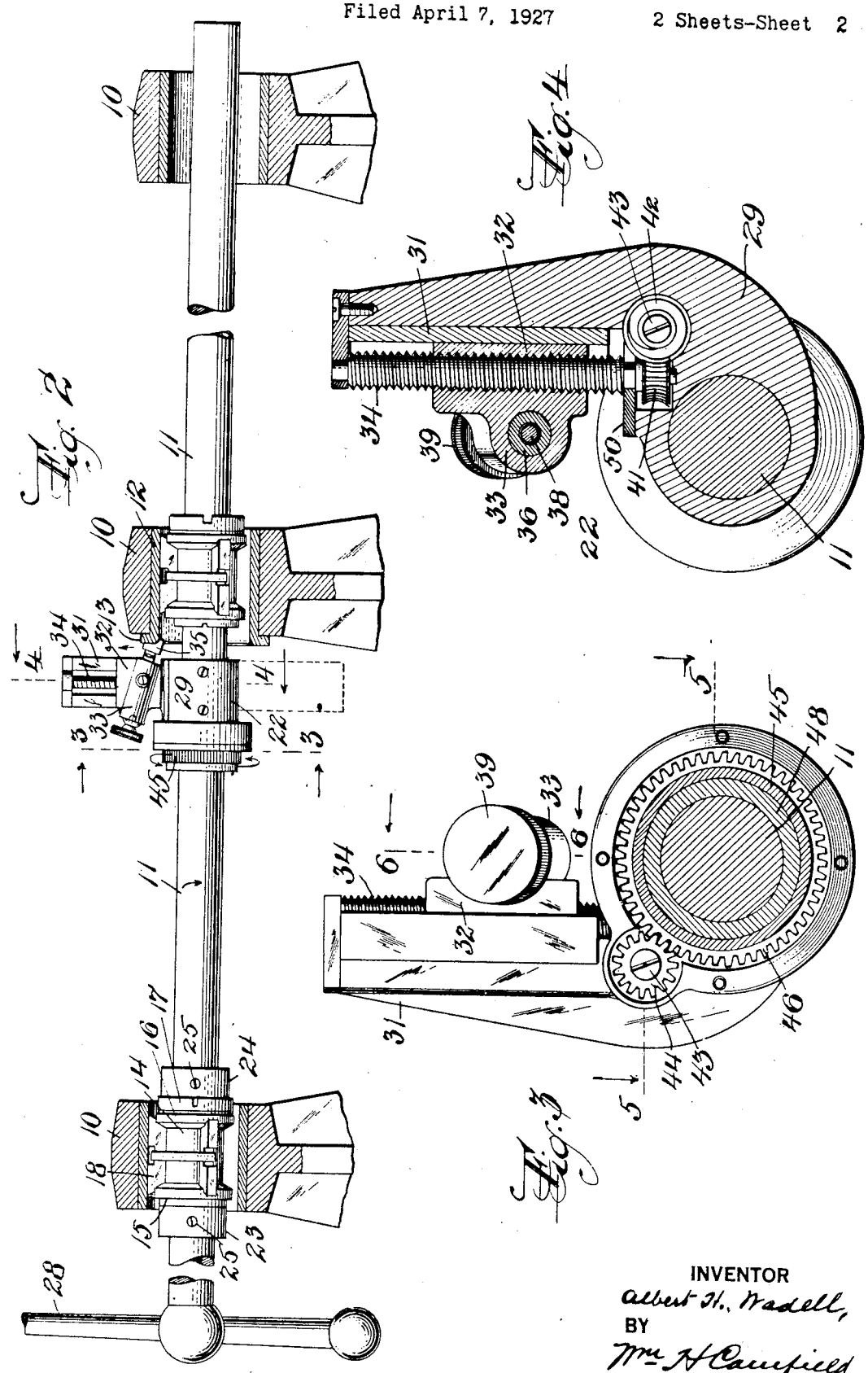
INVENTOR
Albert H. Wadell,
BY
Wm H Caufield,
ATTORNEY Patented Jan. 15, 1929.

1,698,862

UNITED STATES PATENT OFFICE.

ALBERT H. WADELL, OF NEWARK, NEW JERSEY.

MACHINE FOR TRIMMING BEARINGS.

Application filed April 7, 1927. Serial No. 181,699.

This invention relates to a machine for accurately, quickly and economically trimming the faces of the sides of bearings and also finishes the rounded edge or radius of the bearing.

The machine is adapted for various uses but is particularly adapted for trimming the bearings in crankcases of internal combustion engines and this specification, for purpose of clear description, is limited in its application to a crank case.

This invention is designed to provide a portable simple machine that comprises a rod with a means for rotating it, chucks for supporting the rod in the bearings of the crankcase and a trimming tool that is moved radially relative to the rotating rod, the movement of the tool being regulated by a manually operated element such as a collar around the shaft.

The invention is illustrated in the accompanying drawings in which Figure 1 illustrates the device mounted in the bearings of a crankcase and illustrating the tool as operating on the face of the central bearing. Figure 2 is a similar view showing the tool rounding the edge of the bearing which is done after the face of the bearing has been trimmed. Figure 3 is an enlarged section taken on line 3—3 in Figure 2 and Figure 4 is a similar section taken on line 4—4 in Figure 2. Figure 5 is a section taken on line 5—5 in Figure 3. Figure 6 is a section on line 6—6 in Figure 3 and Figure 7 is an enlarged view of the cutter after it bears on the bearing to trim the face thereof. Figure 8 is a similar view showing the tool finishing the rounded portion or the interior diameter and the outer face of the bearing.

In the drawing 10 indicates the main bearings of a crankcase and all or some of these are used for supporting the shaft 11 of the machine.

The bearings have within their cases the usual linings 12 which are the elements that are finished to an accurate fit and alignment by suitable machines such as that illustrated in my application No. 716,389, filed May 28, 1924. After this is done the bearings have to be trimmed on the outside flange as shown at 13.

The bearings themselves are used for supporting the present machine and since they are accurately aligned the shaft 11 is mounted in chucks that are expanded within the bearings, these chucks comprising a sleeve 14 which has on one end a tapered collar 15 which is fixed on the sleeve, that is, fixed against longitudinal movement and the movable collar 16 on the other end is adjusted by means of a nut 17. The collars 15 and 16 have inclined faces that bear against the arms 18 so that when the collar 16 is pushed in by means of the nut 17 the chuck is expanded within the bearing until it is tightly clamped therein. This is usually accomplished by wrenches 19 which are placed around the shaft and have projections that fit into the recesses 20 of the collar 17. Elastic bands 21 are simply for the purpose of holding parts of the chuck together when it is contracted and removed from the bearing. After the adjustment above described has been made on the required number of chucks, usually two, the shaft 11 is slid out from these chucks and the wrench 19.

The shaft 11 is now replaced and when it is inserted it is passed through the tool holder 22 in which it initially fits loosely thereon, and is also slid with the collars 23 and 24 which are then fastened by the screws 25 which bear against the sides of one of the chucks and act as thrust bearings. In case of light installation these thrust bearings 23 and 24 can be reversed and used as wrenches as they have the projections 26 that can be inserted in the recess 20 of the nut 17 to turn them into the recess 27 of the sleeve to hold it against rotation while the nut 17 is being tightened or released.

In heavier installations, however, the use of the wrench 19 is preferred. The shaft is provided with a handle 28 by means of which it is rotated. The tool holder 22 comprises a casing 29 usually of cast iron which is fastened to the shaft by set screws 30 or equivalent means and has projected therefrom a slide-way or bracket 31. A slide 32 which carries the tool holder 33 bears on the slideway and is moved up and down, or rather, longitudinally relative to the shaft by a screw 34 fastened against longitudinal movement in the tool holder and being in screw-threaded engagement with the slide 32 so that the tool holder is moved when the screw is rotated and is held against movement when the screw is not rotated. The tool holder carries the tool 35 which is adjustable in the tool holder and the form of adjustment shown comprises a shank 36 on the tool which has a screw-threaded recess 37 and into this recess is fitted a screw 38 which has a handle 39 by which it is rotated. The screw thus moves the tool in and out as the screw is held against movement by a pin or screw 40. When adjusted the tool is tightly clamped in place by a set screw 41 which clamps the shank 36 of the tool.

The screw for moving the tool holder is rotated by a connection actuated by the rotating shaft 11 and in the form shown it consists of a worm gear 41 driven by a worm 42 on a shaft 43. The shaft 43 has a pinion 44 on its end. All these parts are mounted in the casing 29 and are carried around with it when it rotates with the shaft 11. On the shaft 11 is a collar 45 which fits loosely thereon and is not rotated by the shaft and it carries a gear 46 which meshes with the pinion 44 so that when the collar 45 is held fast by one hand and the handle 28 is turned by the other hand the tool is carried around to engage the work and the tool holder is slowly drawn across the face of the work as the tool rotates. The collar 45 is prevented from being separated from the casing 29 by the flange 47 of the sleeve 48 which is screwed into the casing 29. A cover plate 49 protects the gear 46 and pinion 44. A dust plate 50 is arranged to prevent fillings settling around the worm and worm gear.

The tool 35 is provided with a straight cutting edge 51 for engaging the face 52 of the bearing and has a curved cutting face 53 to finish the corner of the bearing as shown in Figure 8. The operation of this device is as follows:

After the shaft has been mounted as above described in the chucks and the tool has been adjusted on the outer edge of the bearing as shown at *a* in Figure 7, the handle 28 is turned by one hand and the workman holds the collar 45 which is usually knurled with the other hand and the gear 46 is thus held against rotation. While the tool holding attachment 22 is carried around with the shaft and through the pinion 45 and the associated parts the screw 34 is rotated so that the tool holder 33 gradually travels inward so that the tool pursues a spiral path and finishes the face 52 to form an even and smooth surface.

After this has been accomplished, the tool is carried beyond its position and then readjusted by the screw 38 so that the face 54 of the cutter which is not a cutting edge acts as a gauge against the face 52 as shown in Figure 8. The tool is now caused to travel outward, that is, away from the center of the shaft from the position shown in *b* in Figure 8 until it arrives at the position shown in Figure 2 and in full lines in Figure 8.

This is done by rotating the handle 28 in the same direction it was rotated before, the natural direction being clockwise, and the workman instead of holding the collar 45 in fixed position rotates it in the same direction as the rotation of the shaft but at a slightly increased rate. As the gear 46 is much larger than the pinion 44, this advanced rotation causes the screw 34 to be so rotated as to cause the tool to move outwardly from the center of the shaft and the edge 53 finishes the corner of bearing and rounds it.

I claim:

1. A machine for trimming the bearings of crank cases and the like, comprising chucks to fit into the bearings, a shaft rotatable in the chucks, a tool holder including a slideway and secured to the shaft, a slide on the slideway, a tool secured to the slide, a screw on the tool holder and on which the slide travels, a short shaft in the tool holder, a worm on the short shaft, a worm gear on the screw, a pinion on the short shaft, a collar loosely arranged on the shaft and a gear on the collar and in mesh with the pinion whereby the tool can be adjusted radially from the collar radially both toward and from the shaft while the shaft is rotating, said tool having a part for engaging the face of the bearing and a part for rounding the corner of the bearing whereby the whole bearing can be finished in one continuous operation.

2. A machine for trimming bearings of crank cases, comprising a shaft to rotate within aligned bearings and supported therein, a tool holder extending radially from the shaft and secured thereto and including a slideway, a slide in the slideway, a tool in the slide, a screw in the slide for moving the tool back and forth for adjustment, a screw in the tool holder on which the slide travels when the screw is rotated, a short shaft in the tool holder, a worm on the short shaft, a worm gear on the screw, a pinion on the short shaft, a collar loosely arranged on the shaft and with its circumference free for grasping so that its direction and speed of rotation can be continuously controlled, and a gear on the collar and in mesh with the piston whereby the tool can be adjusted radially from the collar, the tool having its cutting edge adapted for use on the face of the bearing and also for use in rounding the corner of the bearing.

In testimony whereof I affix my signature.

ALBERT H. WADELL.